3,035,027
// Patented May 15, 1962

3,035,027
CROSS-LINKING COPOLYMERS OF N-CARBAMYLMALEIMIDE
Pliny O. Tawney, Passaic, N.J., assignor to United States Rubber Company, New York, N.Y., a corporation of New Jersey
No Drawing. Filed July 8, 1958, Ser. No. 747,123
10 Claims. (Cl. 260—77.5)

The present invention is concerned with a novel plastic material which is especially useful as a protective coating in paints, clothing, paper products and the like.

Polystyrene is an important and widely used plastic in industry today. Its application is limited, however, because of a relatively low softening point and solubility in a great number of solvents. Replacement of polystyrene by another plastic in industry is not likely unless the new plastic possesses at least the desirable properties of polystyrene or it can compensate for the absence of such desirable properties by having better properties in one or more respects, such as softening point, solubility, etc.

The present invention is concerned with a plastic material which is competitive with polystyrene.

An object of this invention is to provide a plastic which may be used as a protective coating in paints, textiles, paper products and the like.

Another object of this invention is to provide a plastic material which is substantially inert to the cross-linking influence of metal ions and thus has utility as a barrier against hydrocarbon diffusion.

Still another object is to provide a plastic material which is capable of being molded or cast into a permanent form.

Other objects and advantages will become apparent from the following description and explanation thereof.

The present invention is concerned with an interpolymer of N-carbamylmaleimide or the hydrocarbon substituted derivative thereof with a copolymerizable compound containing an ethylenic linkage which may be designated structurally as follows:

and such a linkage contains various substituents which are well known to those skilled in the art.

In a particular aspect, the invention is concerned with an interpolymer of the kind described above which has been further treated with a cross-linking agent. The interpolymer which has not been treated with a cross-linking agent will have a softening point of about 25° C. above that of polystyrene, whereas the cross-linked interpolymer which is capable of being irreversibly molded or formed into any desired shape can be employed at temperatures up to about 200–300° C. without significant adverse effects.

The interpolymer is prepared by combining the imide with the copolymerizable ethylenic compound in a suitable solvent and in the presence of a free radical polymerization catalyst and the reaction mass is permitted to copolymerize under suitable reaction conditions for a desired length of time. Even though in some instances the comonomers tend to homopolymerize, ordinarily no difficulty is encountered in effecting copolymerization by means of the present invention.

Experimentally it was found that there is a strong tendency for the comonomers to assume an alternate arrangement in the copolymer molecule. This tendency is evident during the early stages of the reaction despite the molar ratio of comonomers. When the reaction is permitted to approach completion, the relative amount of comonomers in the copolymer tends to follow the ratio in which they are present in the feed or starting material.

A possible explanation is that in the beginning of the reaction there is usually enough of either comonomer for the polymerization to occur by alternate arrangement of the comonomers, but as soon as the amount of one comonomer falls below a certain level, the predominating comonomer will polymerize with itself, following the law of probability. Hence, it is possible to control the relative amounts of comonomers in a given copolymer by regulation of the starting feed ratios or controlling the reaction period or both. The properties of the copolymer will vary somewhat with the relative proportions of comonomers, and this offers a method of controlling the quality of the product.

The reaction takes place under substantially anhydrous conditions. Water will react with the imide to produce the corresponding acid, e.g., N-carbamylmaleimide will be converted to N-carbamylmaleamic acid; therefore, it is to be avoided. A suitable solvent such as dioxane, dimethyl formamide, dimethyl sulfone, and the like is used. The selection of solvent depends upon the comonomers and the conditions to be used for polymerization, all of which are well known to those skilled in the art, and require no further explanation here.

The comonomers are polymerized in the presence of a catalyst which is well known in the art as being one which catalyzes free radical polymerization. A large number of catalysts are included in this category, but here again, a skilled person would have no difficulty in understanding the nature of the catalyst to be used for the present invention. For example, the peroxide catalysts, including acyl peroxides, alkyl peroxides, cycloalkyl peroxides, etc., fall in this classification. The hydroperoxides, such as alkyl hydroperoxide, cycloalkyl hydroperoxide, etc., also fall in this category. Other classes include the peroxy acids or salts. Specific examples of catalysts are benzoyl peroxide, acetyl peroxide, peroxybenzoic acid, potassium peroxysulfate, etc.

The temperature at which the polymerization reaction takes place depends upon the catalyst being used. The catalysts are widely known and the temperatures under which they are employed are equally well known. For example, when acetyl peroxide is used, the temperature of reaction is usually about 40–50° C. Benzoyl peroxide and Porofor N usually require a reaction temperature of about 60–80° C., whereas di-tertiary-butyl peroxide involves a temperature of about 125–140° C.

The proportions in which the comonomers are reacted may vary widely from the standpoint of operability. Just so long as two comonomers are present, the reaction will proceed. The properties of the resultant copolymer are influenced somewhat by the relative amount of a particular comonomer in the molecular structure of the copolymer. For example, increasing the relative amount of imide over styrene in the copolymer of my invention tends to increase its impact strength. The preponderance of one monomer over the other will be dictated by the intended use or purpose of the plastic. In general, the ratio of ethylenic compound to imide is in the range from about 0.25:1 to 10:1.

The imide to be used in the present invention can be represented by the following structural formula:

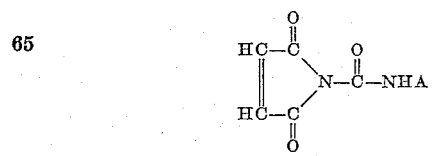

wherein A is hydrogen or a hydrocarbon radical, e.g., alkyl, alkenyl, aryl, aralkyl, alkaryl, etc. Specific examples of the imide are N-carbamylmaleimide,
N-(n-butylcarbamyl)-maleimide,
N-(phenylcarbamyl)-maleimide,
N-(naphthenylcarbamyl)-maleimide,
N-(ethylcarbamyl)-maleimide,
N-(butenylcarbamyl)-maleimide,
N-(methylphenylcarbamyl)-maleimide,
N-(phenylpropylcarbamyl)-maleimide,
N-(cyclohexylcarbamyl)-maleimide, etc.

The copolymerizable compound containing an ethylenic linkage, represented structurally as >C=C< is known in the art to copolymerize with comonomers. One large class includes those which have a terminal ethylenic group and many be represented structurally as

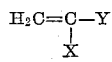

For one group of compounds X is selected from hydrogen and methyl, and Y is selected from halogen, e.g., chlorine, acetate, phenyl, carboxyalkyl, alkoxy, alkenyl, alkyl, etc. This group is exemplified by styrene, methylstyrenes, vinyl acetate, vinyl chloride, isobutylene, 1,5-hexadiene, allyl acetate, methyl vinyl ketone, methyl vinyl ether, isopropenyl acetate, etc.

The acrylic type compounds are also used as comonomers and include, for example, the acids, esters, amides, nitriles, etc. Referring to the above structural formula, X is hydrogen or methyl and Y is cyano,

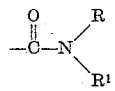

or —COOR wherein R and $R^1$ are selected from hydrogen, alkyl or aralkyl groups. Specific examples are acrylonitrile, methyl acrylate, methyl methacrylate, acrylamide, ethyl acrylate, butyl acrylate, 2-ethylhexyl acrylate, ethyl methacrylate, acrylic acid, methacrylic acid, etc.

The monovinylpyridines also fall within the above described structural formula of the copolymerizable ethylenic compound. In such case, X is hydrogen and Y is a pyridinyl or an alkyl substituted pyridinyl group. Specific examples of the pyridines are 2-, 3-, and 4-vinylpridine, 2-methyl-5-vinylpyridine, 5-ethyl-2-vinylpyridine, 2-methyl-6-vinylpyridine, 2-ethyl-4-vinylpyridine, etc.

Those comonomers in which the $CH_2$=C< group is attached directly to a negative group tend to copolymerize easily, and so they are preferred. Typical negative groups are aromatic hydrocarbon groups, carboxylic, ester, amide, nitrile, chloride, carbonyl, alkoxy, etc. The allylic compounds do not come within such a classification, because the $CH_2$=C< group is not attached directly to a negative group. Such comonomers react less rapidly with the imide.

The unsaturated dicarboxylic acids, esters, anhydrides, amides, nitriles, etc. in which the ethylenic linkage is present serve as comonomers for the present invention. Specific examples are maleic anhydride, citraconic acid, itaconic acid, fumaric acid, mesaconic acid and the corresponding esters, amides, nitriles thereof.

In order to provide a fuller understanding of the present invention, reference will be had to the following specific examples:

Example 1

Equal weights of carbamylmaleimide and maleic anhydride were dissolved in dry dioxane together with a small quantity of benzoyl peroxide. Ten parts by weight of carbamylmaleimide, 10 parts by weight of maleic anhydride and 0.2 part by weight of benzoyl peroxide were charged to 200 parts by weight of dioxane and heated in a water bath at 65–70° C. for 7½ hours. At the end of 4½ hours, an additional 0.2 part by weight of benzoyl peroxide were added. The dark solution was poured into a large quantity of benzene and the precipitate filtered and dried. The starting molar feed ratio was 1.44:1.0 carbamylmaleimide:maleic anhydride and on the basis of carbon analysis, the copolymer ratio was calculated as 1.1 to 1.0. The yield was purposely kept low, being less than 10%, and the proportions of monomers in the copolymer thus showed up the tendency to alternate. The copolymer was found to be insoluble in tetrahydrofuran, and most other organic solvents with the exceptions of pyridine and dimethylformamide; in the latter, its intrinsic viscosity was 0.05.

Example 2

Ten parts by weight of carbamylmaleimide and 40 parts by weight of styrene and then one part of N,N'-azobis(alpha-isobutyronitrile) as a catalyst were dissolved in 75 parts of dimethylformamide and heated on a water bath at 70–80° C. for about 20 minutes and then the reaction deliberately stopped by pouring into acetone where a voluminous white precipitate resulted. Filtered and dried in vacuo. The yield was 33% by weight.

The copolymer was found to be insoluble in butanol, xylene, acetone, methanol, 2 N sulfuric acid and nitromethane. It was only very slightly soluble in dioxane, methyl ethyl ketone, tetrahydrofuran and acetic acid. It was completely soluble in dimethylformamide and in 5% sodium hydroxide.

The ratio of feed charged was 1 mole of carbamylmaleimide to 5.34 moles of styrene. When the reaction was deliberately stopped before completion with only 33% conversion of the carbamylmaleimide to copolymer, analysis showed a copolymer composition of 1 mole carbamylmaleimide to 1.22 moles of styrene thus further evidencing the tendency to alternate. Intrinsic viscosity in dimethylformamide was found to be 2.04.

Example 3

Ten parts by weight of carbamylmaleimide, 23.5 parts vinyl acetate, 0.1 part of benzoyl peroxide and 200 parts of dioxane were treated as previously. The reactants were heated to 80° C. and copolymerization took place immediately. After 5 hours, 11 parts vinyl acetate and 0.1 part benzoyl peroxide were charged and continued heating for 1 hour when it was stopped and allowed to stand overnight. The resultant slurry was then poured into acetone giving a tan copolymer precipitate which was filtered and dried. The yield was 17% by weight.

This copolymer was found to be insoluble in dioxane, methyl ethyl ketone, butanol, xylene, tetrahydrofuran, ethyl acetate, chloroform, nitromethane, acetic acid and 6 N sulfuric acid. It was soluble in dimethylformamide and in 10% sodium hydroxide.

The starting molar feed ratio was 1:3.15, carbamylmaleimide:vinyl acetate. At the 17% conversion achieved, the ratio was found to be 1:1.2 with an intrinsic viscosity in dimethylformamide of 0.13.

Example 4

The following ingredients were heated for 7½ hours at 70° C.

| | Parts by weight |
|---|---|
| Carbamylmaleimide | 140 |
| Methyl acrylate | 86 |
| Acetonitrile | 1600 (solvent) |
| Porofor N | 1.64 |

After heating, the solvent was decanted and the polymer was dissolved in dry dioxane and filtered. The filtrate was stirred into diethyl ether and dried giving a fluffy white powder with a melting point greater than 225° C. By analysis, a 55% yield was observed with a molar ratio of 2 moles methyl acrylate per mole of carbamylmaleimide; found to be insoluble in diethyl ether, acetone, tetrahydrofuran, and acetonitrile.

Example 5

The following in parts by weight were placed in a brown bottle, flushed with nitrogen and heated for 16 hours at 60° C. Thereafter, the reaction mass was filtered and washed with acetonitrile and acetone.

| | Parts by weight |
|---|---|
| Carbamylmaleimide | 140 |
| Acrylonitrile | 53 |
| Dioxane | 386 (solvent) |
| Benzoyl peroxide | 1.21 |

The copolymer yield was 59% with analysis showing a molal ratio of carbamylmaleimide to acrylonitrile of 1.9 to 1 and a melting point of greater than 195° C. It was found to be insoluble in ethanol, acetone, methyl ethyl ketone, acetonitrile, dioxane, ethyl acetate, carbon tetrachloride and toluene. It was found to be soluble in dimethylformamide and in dimethyl sulfone.

Example 6

In order to test the paper strength improving properties of the copolymers, sheets of saturating paper were die-cut to strips 1" x 3". The strips were oven-dried at 100° C. for 2 hours and then dipped in dimethylformamide solutions containing 5% copolymer. The strips were laid on paper towels to remove the excess liquid and then oven-dried at 95° C.–100° C. for 2 hours. The test strips were then pulled on the Scott Inclined Plane 4 machine using one inch between jaws. Temperature and humidity where held constant at 70° C. and 65%, respectively. Results given below are the average of 4 or 5 runs in each case. The wet tensile strength values were obtained after soaking the dried, polymer dipped paper in water and testing while wet.

| Test Strip | Tensile Strength | |
|---|---|---|
| | Dry | Wet |
| Untreated paper | 14.5 | 0.6 |
| Paper treated with dimethylformamide | 9.8 | 0.6 |
| Paper treated with copolymer of Example 2 | 30.7 | 9.7 |
| Paper treated with copolymer of Example 4 | 23.3 | 4.0 |
| Paper treated with copolymer of Example 3 | 18.3 | 1.9 |

The copolymers of this invention can also be cross-linked by suitable agents. The use of cross-linking agents makes it possible to use resultant products at temperatures of up to 200–300° C. Such products can be molded or formed into permanent shapes prior to the activation of the cross-linking agent, and hence may be used in applications for which polystyrene is entirely unsuitable.

The cross-linking agents useful for the purpose of this invention are well known to those skilled in the art as those having two functional groups. Illustrative classes of compounds which can be used as cross-linking agents are the glycols, and di(hydroxyalkyl) phenolic compounds. Specific examples of cross-linking agents are the alkylene glycols, including ethylene glycol, diethylene glycol, propylene glycol, etc.; and dimethylol phenol. The quantity of cross-linking agent used will depend upon the particular physical properties desired. Usually about 0.1 to 20 parts by weight of cross-linking agent, per 100 parts of the copolymer, are employed to obtain an irreversibly shaped product, i.e., one which cannot be molded. The temperature of the cross-linking reaction will vary in accordance with the agent employed, and will be apparent to those skilled in the art; for the purpose of this invention, it may vary from about 0° C. to 150° C. A solvent of the type described hereinabove may also be used to facilitate mixing, etc. of the reaction mass.

The following example illustrates a method of preparing such a cross-linked copolymer.

Example 7

Twenty-nine parts by weight of styrene-carbamylmaleimide copolymer, 200 parts of dry dioxane as a solvent and 5.3 parts of diethylene glycol were heated for 20 minutes at 95–100° C. After drying, the resultant product was placed between two heated platens at a pressure of 100 pounds per square inch of steam. Upon removal of the material, it was noted that the material had not been molded but instead retained its original appearance. The copolymers were also shown to react with mono-alcohols upon heating. This is believed to occur because the copolymerization takes place across the double bonds leaving intact the imide structure for possible further reaction.

Having thus described my invention, what I claim and desire to protect by Letters Patent is:

1. The method of preparing a plastic material capable of being irreversibly shaped comprising providing an interpolymer of an imide having the structural formula

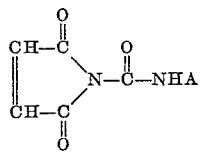

wherein A is selected from the group consisting of hydrogen atom and a hydrocarbon radical with a different ethylenic monomer copolymerization therewith, and cross-linking by mixing 100 parts of said interpolymer with from about 0.1 to 20 parts of a polyhydric alcohol under substantially anhydrous conditions at a temperature below 150° C.

2. The plastic material prepared by the method of claim 1.

3. The method of claim 1 wherein the mixture of interpolymer and cross-linking agent is shaped prior to heating.

4. The method of preparing a plastic material capable of being irreversibly shaped comprising providing an interpolymer of an imide having the structural formula

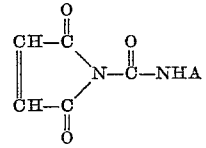

wherein A is selected from the group consisting of hydrogen atom and a hydrocarbon radical with a copolymerizable monomer containing a terminal ethylenic group which monomer is selected from the group consisting of styrene, methylstyrene, vinyl acetate, vinyl chloride, isobutylene, 1,5 hexadiene, allyl acetate, methallyl acetate, methyl vinyl ketone, methyl vinyl ether and isopropenyl acetate, and cross-linking by mixing 100 parts of said interpolymer with from about 0.1 to 20 parts of a polyhydric alcohol under substantially anyhdrous conditions at a temperature below 150° C.

5. The plastic material prepared by the method of claim 4.

6. The method of claim 4 wherein the mixture of interpolymer and cross-linking agent is shaped prior to heating.

7. The method of preparing a plastic material capable of being irreversibly shaped comprising providing an interpolymer of N-carbamylmaleimide with styrene, and cross-linking by mixing 100 parts of said interpolymer with from about 0.1 to 20 parts of a polyhydric alcohol under substantially anhydrous conditions at a temperature below 150° C.

8. The plastic material prepared by the method of claim 7.

9. The method of claim 7 wherein the cross-linking agent is diethylene glycol.

10. The method of claim 7 wherein the mixture of interpolymer and cross-linking agent is shaped prior to heating.

References Cited in the file of this patent
UNITED STATES PATENTS

| | | |
|---|---|---|
| 2,313,565 | McDowell et al. | Mar. 9, 1943 |
| 2,342,295 | Orthner et al. | Feb. 22, 1944 |
| 2,721,186 | Tawney | Oct. 18, 1955 |
| 2,854,438 | Snyder et al. | Sept. 30, 1958 |

# UNITED STATES PATENT OFFICE
CERTIFICATE OF CORRECTION

Patent No. 3,035,027                                 May 15, 1962

Pliny O. Tawney

It is hereby certified that error appears in the above numbered patent requiring correction and that the said Letters Patent should read as corrected below.

Column 6, line 31, for "copolymerization" read -- copolymerizable --.

Signed and sealed this 28th day of August 1962.

(SEAL)
Attest:

ESTON G. JOHNSON                              DAVID L. LADD

Attesting Officer                                 Commissioner of Patents